J. W. HILFRANK.
EXPANSION FASTENING FOR CASTERS.
APPLICATION FILED MAY 26, 1916.
1,223,877. Patented Apr. 24, 1917.
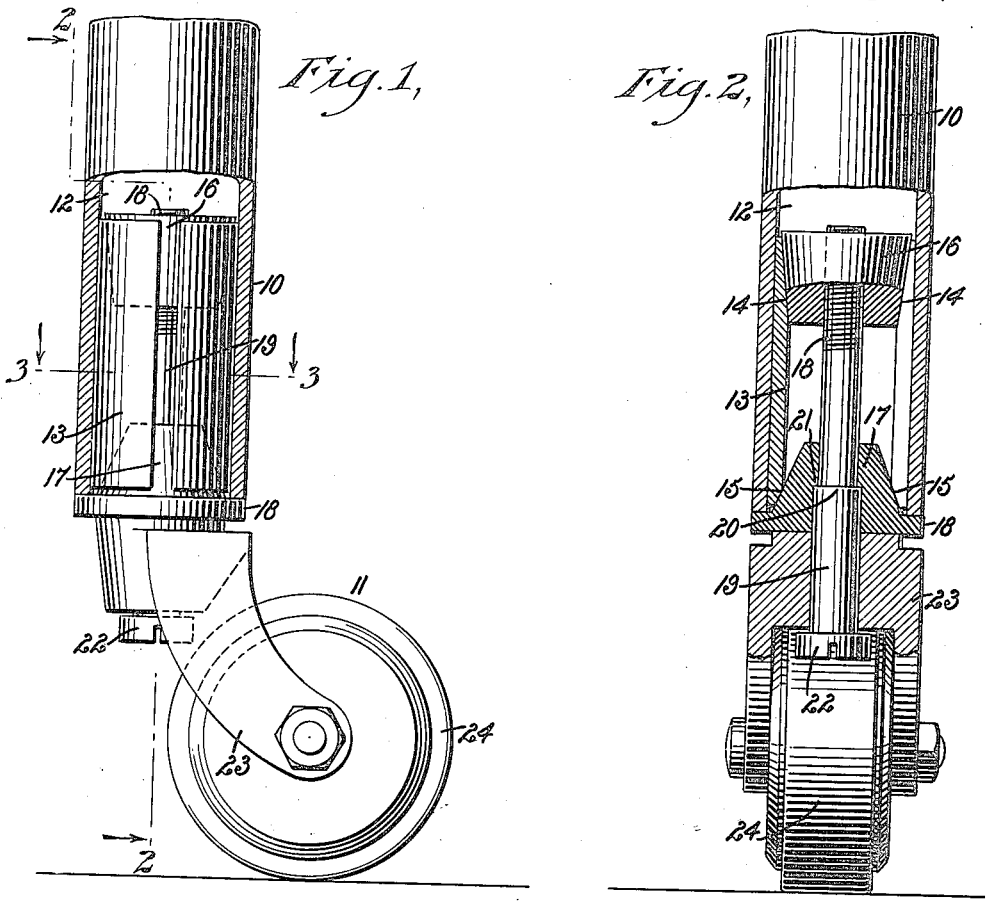
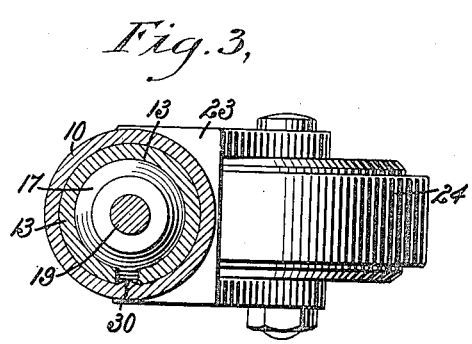
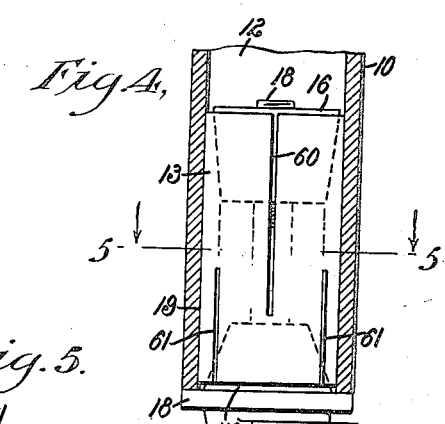
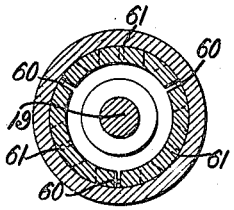
WITNESSES
Edw. Thorpe
Geo. G. Hooker
INVENTOR
John W. Hilfrank
BY Mmm & Co
ATTORNEYS

UNITED STATES PATENT OFFICE.

JOHN W. HILFRANK, OF WHITE PLAINS, NEW YORK, ASSIGNOR OF ONE-THIRD TO LELAND HOTALING, OF WHITE PLAINS, NEW YORK.

EXPANSION-FASTENING FOR CASTERS.

1,223,877.  Specification of Letters Patent.  Patented Apr. 24, 1917.

Application filed May 26, 1916. Serial No. 99,997.

*To all whom it may concern:*

Be it known that I, JOHN W. HILFRANK, a citizen of the United States, and a resident of White Plains, in the county of Westchester and State of New York, have invented a new and Improved Expansion-Fastening for Casters, of which the following is a full, clear, and exact description.

The object of the invention is to provide a new and improved expansion fastening for fastening casters to bedposts, and other articles to walls and the like, which fastening is simple and durable in construction, easily placed in position, and arranged to securely hold the fastening in place, to allow the article to swing freely on the fastening after the latter is secured in position, and to permit convenient removal of the fastening whenever it is desired to do so.

In order to accomplish the desired result, use is made of a split sleeve adapted to be inserted into a recess in the part on which the expansion fastening is to be used, the said sleeve being provided at its ends with interior conical seats, conical inner and outer heads seated on the said seats, the outer head having a flange adapted to abut against the face of the part on which the fastening is used, and a screw rod extending through said outer head and screwing in the said inner head, the said screw rod having a shoulder abutting against the outer head.

A practical embodiment of the invention is represented in the accompanying drawings forming a part of this specification, in which similar characters of reference indicate corresponding parts in all the views.

Figure 1 is a side elevation of the expansion fastening as applied to a bedpost and used for holding a caster in position, part of the bedpost being shown in section;

Fig. 2 is a transverse section of the same on the line 2—2 of Fig. 1 and with a portion of the inner conical head shown in section;

Fig. 3 is a sectional plan view of the same on the line 3—3 of Fig. 1;

Fig. 4 is a side elevation of a modified form of caster as applied to a bedpost, the latter being shown in section; and Fig. 5 is a sectional plan view of the same on the line 5—5 of Fig. 4.

The expansion fastening illustrated in the drawings is shown applied to a tubular bedpost 10 and it forms part of a caster 11 for holding the latter in position on the bedpost 10, but I do not limit myself to this particular application of the expansion fastening. Into the opening or recess 12 of the bedpost 10 fits a split sleeve 13 provided at its ends with interior conical seats 14 and 15 engaged by conical heads 16, 17, of which the conical head 16 is the inner one and the conical head 17 is the outer one and is provided with an annular flange 18 abutting against the under side or face of the bedpost 10. In the inner conical head 16 screws the threaded end 18 of a screw rod 19 having a shoulder 20 abutting against a shoulder 21 formed in the outer conical head 17, which latter is loosely engaged by the screw rod 19. By the arrangement described, the screw rod 19 is held against upward movement in the bedpost 10 after the annular flange 18 is seated against the lower end or face of the bedpost 10. The screw rod 19 is provided with a head 22 a distance from the flange 18 to form a journal for the frame 23 carrying the usual wheel 24 of the caster 11.

In practice, the angle of the conical seat 14 is somewhat smaller than that of the conical seat 15, and the heads 16 and 17 are correspondingly tapered so that the inner head 16 can readily expand or spread the sleeve 13 on screwing up the screw rod 19. It is understood that by this expansion or spreading of the sleeve 13 the latter is firmly fastened within the opening 12 of the bedpost 10, and by having the shoulder 20 of the screw rod 19 abutting against the shoulder 21, the frame 23 of the caster is at all times free to swing on the screw rod 19 as a pivot. It will further be noticed that when the screw rod 19 is screwed up its threaded end 18 draws the conical head 16 downward for spreading the sleeve, as previously explained, and at the same time the shoulder 20 is drawn in firm contact with the shoulder 21 of the movable head 17 so that the screw rod 19 is held against turning and is thus prevented from becoming loose in the fastening.

When it is desired to remove the fastening from the bedpost 10, it is only necessary for the operator to slightly raise the bedpost and then partly unscrew the screw rod 19 and then tap the head 22 thereof so that the conical expansion head 16 is loosened in its seat 14 to allow the sleeve 13 to contract and become sufficiently loose for convenient withdrawal from the bedpost 10. It is understood that by making the angle of the conical seat 15 larger than that of the conical seat 14 the conical head 17 readily becomes loose on its seat 15 on loosening the head 16 as above described.

The sleeve 13 may be provided with a single split extending from end to end, as shown in Figs. 1, 2 and 3, and in this case the split extends along the usual ridge 30 appearing on the inside of tubes used for bedposts 10 and incident to the welding of the joint in the manufacture of the tube. By this arrangement the split spans the ridge 30 and insures a snug fitting and even bearing of the sleeve 13 against the inner surface of the bedpost 10, and at the same time the sleeve 13 is held against turning in the bedpost, as will be readily understood by reference to Fig. 3.

Instead of making the split from end to end, a number of splits 60 and 61 may be formed on the sleeve 13, the splits 60 and 61 being arranged alternately, with the splits 60 extending from the upper end of the sleeve 13 to a distance within the lower end thereof and the splits 61 extending from the lower end of the sleeve a distance upward on the sleeve 13. Thus the conical heads 16 and 17 expand the corresponding upper and lower portions of the sleeve on screwing up the screw rod 19, as previously mentioned. The operation is the same as above described.

It will be seen that by the arrangement described by attaching the fastening to the bedpost 10 the screw 19 is sufficiently unscrewed in the head 16 so that both heads 16 and 17 fit loosely on the conical seats 14 and 15 without expanding or spreading the same. When the parts are in this position the exterior diameter of the sleeves 13 is slightly less than the interior diameter of the bedpost 10 to allow of conveniently slipping the sleeve 13 into the bedpost until the flange 18 abuts against the under side of the bedpost 10. The operator by the use of a screw driver now turns the screw rod 19 so as to draw the conical head 16 downward on the seat 14 whereby the sleeve 13 is forced with its seat 15 into firm contact with the conical head 17 and the sleeve is spread at both ends but more so at the top than at the bottom owing to the difference in the shape of the conical heads and seats, as previously explained. The spreading of the sleeve 13 causes the latter to firmly clamp the sleeve against the inner wall of the bedpost 10 to hold the fastening in place. The caster frame 23 is free to swing on the screw rod 19, as previously mentioned.

When inserting the device into recess 12 and turning the screw rod 19 then the flange 18 of the lower head 17 comes in firm contact with the bottom of the bedpost 10 and at the same time the sleeve 13 is drawn down until its inside surface at the lower end comes in firm contact with the conical portion of the lower head 17 thereby expanding the sleeve and making a perfectly tight fit of the device at the lower end as well as at the upper end. This action prevents any looseness at the lower end of the device, or, in other words, prevents any wiggling of caster fastening at the end where there is the greatest strain. By the arrangement described the lower end of the sleeve 13 is expanded at the same time that the upper end is expanded and the flange 18 is moved up firmly against the bottom of the bedpost 10.

Having thus described my invention, I claim as new and desire to secure by Letters Patent:—

1. An expansion fastening, comprising a split sleeve adapted to be inserted into a recess in the part on which the expansion fastening is to be used, the said sleeve being provided at its ends with interior conical seats, conical inner and outer heads seated on the said seats, the outer head having a flange adapted to abut against the face of the part on which the fastening is applied, and a screw rod extending loosely through the said outer head and screwing in the said inner head, the said screw rod having a shoulder abutting against the said outer head, the screw rod projecting outward beyond the said flange and terminating in a head to form a journal.

2. An expansion fastening for casters and other articles, comprising a split sleeve adapted to be inserted into a recess in the part to which the article is to be attached, the said sleeve having at its ends conical interior seats, of which the angle of the seat at the inner end of the sleeve is smaller than that of the seat at the outer end of the sleeve, conical inner and outer heads seated on the said seats, the outer head having a flange abutting against the face of the part on which the fastening is applied, and a screw rod extending loosely through the said outer head and screwing in the said inner head.

3. An expansion fastening for casters and other articles, comprising a split sleeve adapted to be inserted into a recess in the part to which the article is to be attached, the said sleeve having at its ends conical interior seats, of which the angle of the seat at the inner end of the sleeve is smaller than that of the seat at the outer end of the sleeve, conical inner and outer heads seated on the said seats, the outer head having a bore enlarged at its outer portion forming a shoulder, and a screw rod extending loosely through the said outer head and screwing in the said inner head, the said screw rod having an enlarged portion extending in the enlarged portion of the bore of the outer head and forming a shoulder abutting against the said shoulder of the outer head.

4. An expansion fastening for casters and other articles, comprising a split sleeve adapted to be inserted into a recess in the part to which the caster is to be attached, the said sleeve having at its ends conical interior seats, of which the angle of the seat at the inner end of the sleeve is smaller than that of the seat at the outer end of the sleeve, conical inner and outer heads seated on the said seats, the outer head having a flange abutting against the face of the part on which the fastening is applied, and a screw rod extending loosely through the said outer head and screwing in the said inner head, the said screw rod having a shoulder abutting against the said outer head and the said screw rod having a head at its outer end spaced from the face of the said outer conical head.

5. An expansion fastening, comprising a split sleeve adapted to engage a recess in a part on which the fastening is to be used, the said sleeve having a conical seat at one end, a conical head engaging the said seat, a head held on the other end of the said sleeve and having a flange adapted to abut against the face of the said part, and a screw rod screwing in the said conical head and extending loosely through the said flanged head, the said screw rod having an enlarged portion forming a shoulder bearing against a shoulder formed in the said flanged head, the said enlarged portion of the screw rod projecting outward beyond the said flange and terminating in a head.

6. In combination, a bedpost in the form of a tube having an interior ridge extending lengthwise of the tube, an expansible sleeve fitting the said tube and having a lengthwise extending slit into which projects the said ridge to allow the sleeve to evenly bear against the inner surface of the tube and to hold the sleeve against turning in the tube, and expansion means for expanding the sleeve in the tube.

JOHN W. HILFRANK.